United States Patent [19]

Hernandez

[11] Patent Number: 4,714,012

[45] Date of Patent: Dec. 22, 1987

[54] COOKING VESSEL WITH AN INNER HEAT CONDUCTIVE JACKET AND THE LIKE

[76] Inventor: Rosalio A. Hernandez, 1138 W. Cambridge Ave., Fresno, Calif. 93705

[21] Appl. No.: 906,930

[22] Filed: Sep. 15, 1986

[51] Int. Cl.⁴ .............................................. A47J 37/12
[52] U.S. Cl. ...................................... 99/444; 99/410; 99/412
[58] Field of Search ................ 99/444, 446, 410, 412, 99/413, 417, 319; 126/369

[56] References Cited

U.S. PATENT DOCUMENTS

| | | | |
|---|---|---|---|
| 522,731 | 7/1894 | Hughes | 99/410 |
| 559,172 | 4/1896 | Hall | 99/410 |
| 814,714 | 3/1906 | Longhenry | 99/410 |
| 913,431 | 2/1909 | Renner | 99/410 |
| 975,843 | 11/1910 | Duffy | 99/410 |
| 1,023,645 | 4/1912 | Hamilton | 99/410 |
| 1,205,026 | 11/1916 | Rodgers | 99/410 |

FOREIGN PATENT DOCUMENTS

| | | | |
|---|---|---|---|
| 541830 | 8/1922 | France | 99/412 |
| 100721 | 6/1916 | United Kingdom | 99/410 |

Primary Examiner—Louis K. Rimrodt
Assistant Examiner—J. L. Olds
Attorney, Agent, or Firm—Worrel & Worrel

[57] ABSTRACT

A cooking vessel having an inner heat conductive jacket, the cooking vessel includes an outer heat conductive jacket having a multiplicity of variable length slots; and an inner heat conductive jacket; the inner jacket has heat resistant handles and stabilizer bars adapted to be slidably received internally of the vertically disposed slots; the inner jacket being deployed in various operational attitudes internally of the outer jacket.

5 Claims, 4 Drawing Figures

COOKING VESSEL WITH AN INNER HEAT CONDUCTIVE JACKET AND THE LIKE

BACKGROUND OF THE INVENTION

1. Field of the Invention

The present invention relates to a cooking vessel having an internal heat conductive jacket and more particularly, to a cooking vessel that is adapted to receive a food product to be processed; the internal jacket of the cooking vessel being individually adjustable to deploy the food product in various attitudes internally of the cooking vessel.

2. Description of the Prior Art

It has long been known that particular food products, such as fish, chicken, hamburger, and a variety of vegetables can be immersed and cooked in vegetable oil to produce a tasty dish. It has also been known that various other food products, such as sausage and other pork products, for example, produce substantial amounts of fat based fluids and other liquid by-products during their processing, and are therefore more efficiently processed by frying them in their own juices.

Although it is highly desirable, in some instances to have a meat product cooked in its own juices; professionals in the culinary arts, and others, have looked for ways of easily separating a meat product, for instance, from the fluid by-products which are present in the cooking vessel. It has been the typical practice of both professional chefs and others, when separating the fluid by-products from a meat, for instance, simply to pick up the cooking vessel which has the meat located therein, and to thereafter restrain the meat, using a spatula, the cooking vessel cover, or the like, internally of the cooking vessel, while the fluid by-products and other assorted liquids are drained therefrom. Although this is somewhat effective in causing the separation of the liquid by-products from the meat, it is however cumbersome, and inefficient, and leads frequently to spilling the liquid by-products or meat on the associated kitchen surfaces, the floor or the like.

Attempts have been made in the prior art to provide a suitable vessel which can be suspended internally of an outer cooking vessel. These prior art devices typically utilize hot oil, or hot water, which is employed to cook the food product which is suspended therein.

It should be understood that the prior art cooking vessels have produced numerous laudable results. However, these devices do have numerous drawbacks. For example, the prior art devices have usually employed wire-formed baskets and the like to suspend the food product being processed internally of the outer container. Although this is somewhat effective, it is not a very practical method when employed to process fish, sausage, hamburger, and the like, which can easily break into small pieces, and thereafter slip through the wire mesh basket and into contact with the oil which surrounds it. Moreover, the prior art devices have not generally been capable of suspending the internal jacket in closely adjacent spaced relationship to the hot liquid by-products formed during cooking stage for the purpose of utilizing the heat emitted from these fluids to keep the food warm after the cooking has been completed.

Therefore, it has long been known that it would be desirable to have an improved cooking vessel conformably dimensioned to receive an internal heat conductive jacket; the internal jacket being deployed in various attitudes internally of the outer cooking vessel to effectuate the efficient separation of a liquid by-product from a food being processed.

OBJECTS AND SUMMARY OF THE INVENTION

Therefore, it is an object of the present invention to provide an improved cooking vessel for receiving an internal heat conductive jacket and the like.

Another object is to provide such a cooking vessel which has an outer heat conductive jacket which deploys an inner heat conductive jacket in various attitudes internally of itself.

Another object is to provide such a cooking vessel that has an internal heat conductive jacket which has a bottom surface that has formed therein small drainage holes which permits the passage of liquid therethrough, but not a food which is being processed.

Another object is to provide such a cooking vessel which permits the internal heat conductive jacket to be easily released from a deployed position internally of the outer jacket.

Another object is to provide such a cooking vessel which is characterized by ease of usage, simplicity of construction and which can be manufactured and sold at a nominal expense.

Another object is to provide such a cooking vessel which has an internal heat conductive jacket adapted to conformably mate with the outer heat conductive jacket; the internal jacket being so adapted as to be restrained against horizontal and vertical movement internally of the outer heat conductive jacket.

Further objects and advantages are to provide improved elements and arrangements thereof in a cooking vessel for the purposes described which is dependable, economical, durable and fully effective in accomplishing its intended purposes.

These and other objectives are achieved in a cooking vessel which permits the transmission of heat energy to a food product being processed of the present invention wherein, an outer heating conductive jacket is adapted to receive and closely hold internally an inner heat conductive jacket deploying a pair of handles and a pair of stabilizing bars in an operative attitude for internal receiving engagement with a multiplicity of variable length slots formed therein the outer jacket; the handles and the stabilizing bars restraining and suspending against horizontal and vertical movement the inner heat conductive jacket in selected operative attitudes internally of the outer heat conductive jacket.

DESCRIPTION OF THE PREFERRED EMBODIMENT

Figure 1:
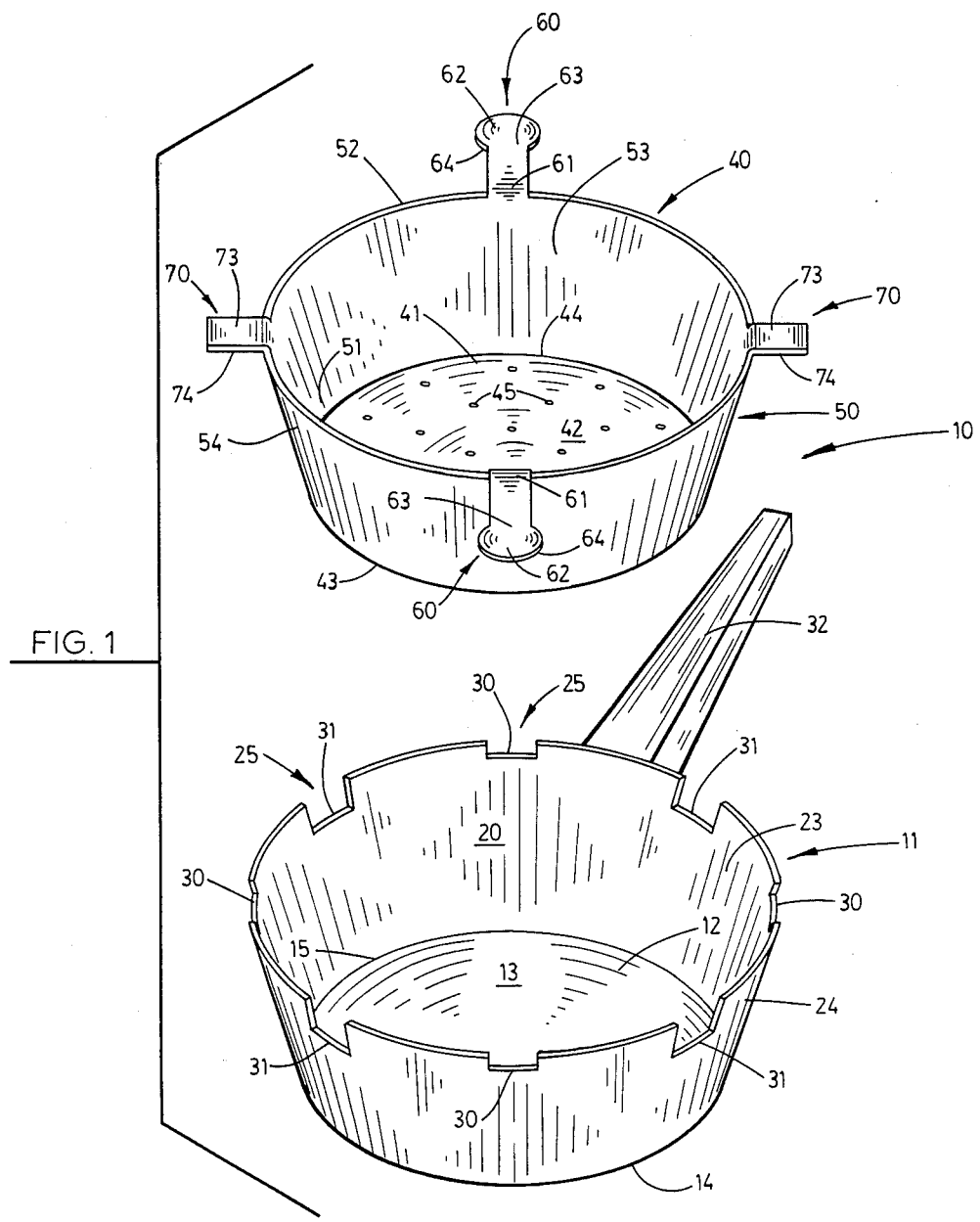
FIG. 1 is a perspective view of the cooking vessel of the subject apparatus with the inner and outer heat conductive jackets thereof separated from each other for illustrative convenience.
Figure 2:
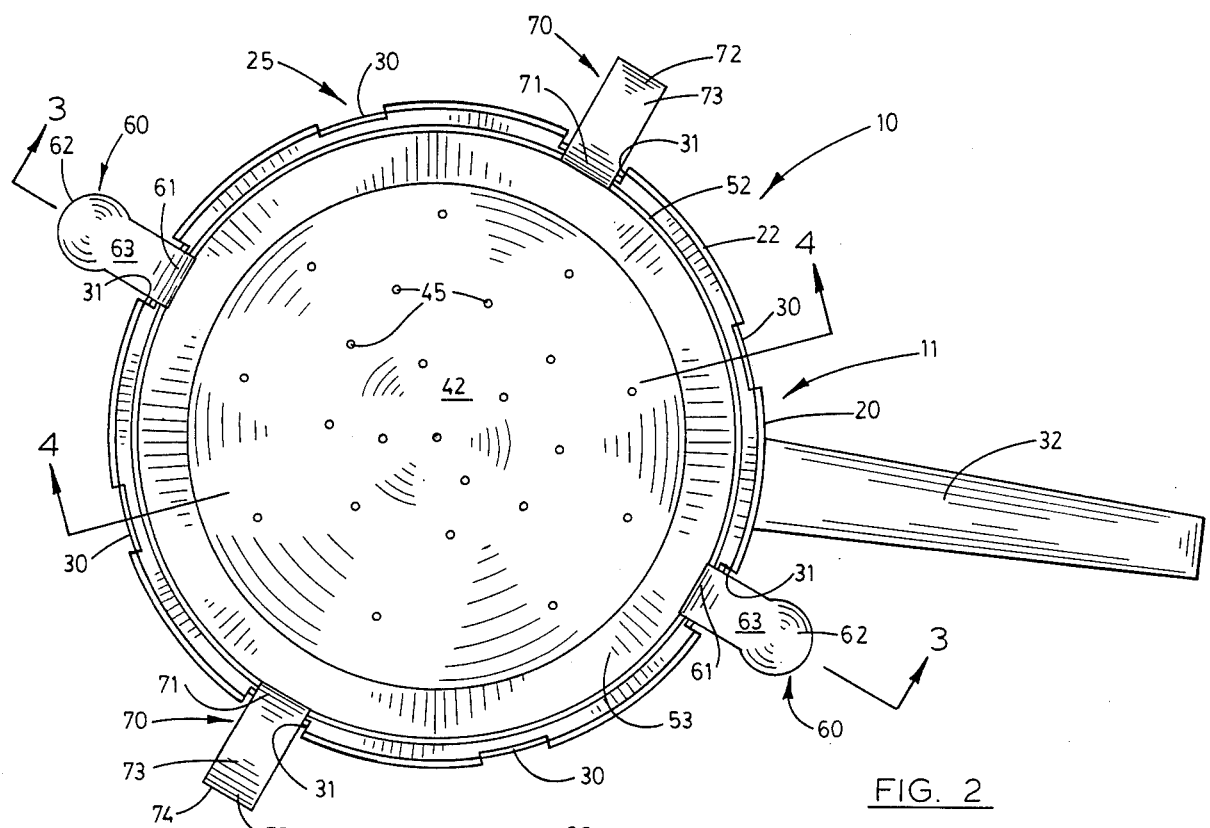
FIG. 2 is a top plan view of the subject apparatus.

Referring more particularly to the drawings, a cooking vessel apparatus having an internal heat conductive jacket and the like embodying the principles of the present invention is indicated by the numeral 10 in FIG. 1. As shown in FIGS. 1 and 2 for illustrative convenience, the apparatus 10 as can best be imagined, is utilized with a stove or the like, which is not shown.

FIG. 1 is a perspective view of the cooking vessel with inner and outer heat conductive jackets.

The apparatus 10 has an outer heat conductive jacket which is generally indicated by the numeral 11 and which is formed of any number of suitable metal type alloys, or alternatively, a material which can withstand microwave emissions in the event that the apparatus is utilized with microwave ovens. The outer jacket 11 has a horizontally deployed substantially planar bottom 12 which has an inside surface 13 and an opposed outside surface 14. The bottom 12 has a peripheral edge 15.

Figure 3:
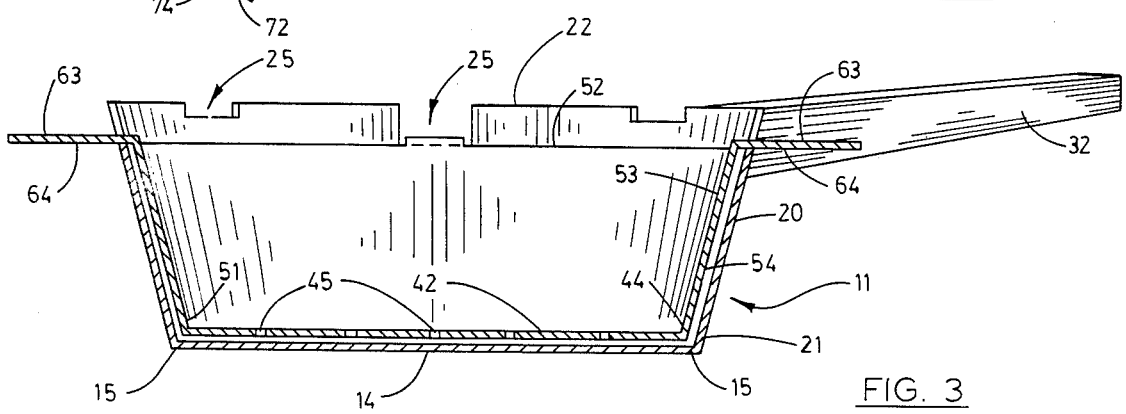
FIG. 3. is a fragmentary, vertical section taken on line 3—3 of FIG. 2.
Figure 4:
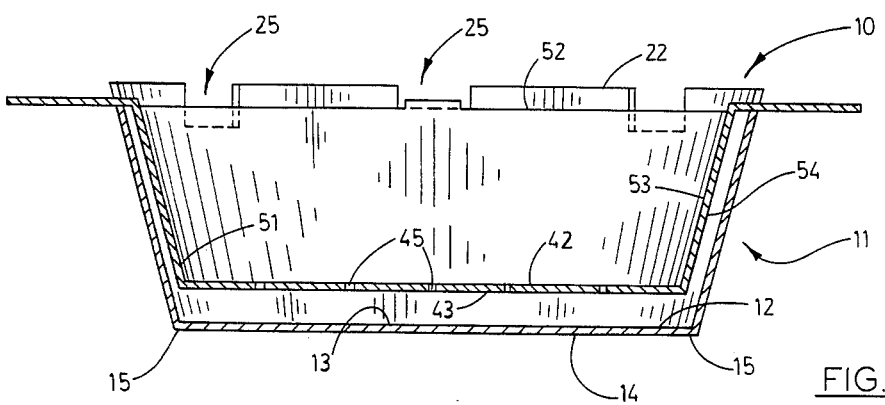
FIG. 4 is a fragmentary, vertical section taken on line 4—4 of FIG. 2.

As best understood by reference to FIGS. 3 and 4, the outer jacket 11 has a substantially vertical wall 20 which is integral with and extends nearly normal to, the bottom 12. As illustrated, the vertical wall is unitary in configuration and has a bottom edge 21, an opposed top edge 22, an inside surface 23, and an outside surface 24. It should be understood that the outer jacket has formed therein a multiplicity of variable length, vertically disposed slots 25 which are illustrated in the preferred embodiment as having a substantially rectangular configuration.

A careful study of FIG. 1 reveals that the vertical side wall 20 has formed therein four shallow vertical slots 30 and four deep vertical slots 31. As illustrated, the shallow and deep slots are positioned in alternative equidistant attitudes about the top edge 22 of the outer jacket 11. It should be understood that the shallow slots are positioned in approximately 90° offset relation, one with another, about the top edge. Similarly, the deep slots are also positioned approximately 90° apart about the top edge. A pot handle 32 is suitably affixed to the outside surface 24 of the outer jacket to permit easy manipulation of the apparatus 10.

As best understood by reference to FIG. 1, the apparatus 10 has an inner heat conductive jacket generally indicated by the numeral 40. The inner jacket 40 is manufactured of approximately the same material as that of the outer jacket 11 and can similarly be manufactured of material which is suitable for use in a microwave oven. However, it should be appreciated that the inner and outer jackets should ideally be manufactured out of materials which have substantially similar coefficients of expansion to permit the individual jackets to be heated together. The inner jacket has a porous bottom 41 which has an inside surface 42 and an opposed outside surface 43. As best seen by reference to FIG. 3, the porous bottom 41 has a peripheral edge 44. As best understood by reference to FIG. 2, the porous bottom has formed therein a multiplicity of small drainage holes 45. The small drainage holes have a small dimension which permits only liquid to pass therethrough. The inner jacket has a substantially vertical side wall 50 which is disposed in nearly normal relation to the porous bottom. As illustrated most clearly in FIGS. 3 and 4, the inner jacket is dimensioned to be received in substantially covering relation internally of the outer jacket, and in fixed spaced relation from the substantially vertical wall 20 of the outer jacket. As best understood by reference to FIG. 1, the side wall 50 has a bottom edge 51, an opposed top edge 52, an inside surface 53 and an outside surface 54.

Affixed to the side wall 50, at the top edge 52 thereof, are two heat resistant handles, generally designated by the numeral 60. As best understood by reference to FIG. 2, the heat resistant handles are individually positioned in opposed attitudes, and in a nearly normal relationship with the outside surface 54 of the inner jacket 40. The heat resistant handles have a first end 61 which is suitably connected to the top edge 52 of the inner jacket; and a second end 62 which would be handled by someone deploying the inner jacket. The heat resistant handle has a top and bottom surface 63 and 64, respectively. The inner jacket also deploys a pair of stabilizing bars indicated generally by the numeral 70. The stabilizing bars are individually positioned in opposed attitudes about the top edge of the inner jacket and are in a substantially normal relationship with respect to the outside surface 54. The stabilizing bars are suitably attached to the top edge of the inner jacket by welding or the like.

OPERATION

The operation of the described embodiment of the present invention is believed readily apparent and is briefly summarized at this point.

The apparatus 10 which permits the transmission of heat energy to a food product being processed is best shown and understood in the perspective view of FIG. 1 with the outer jacket 11 and the inner jacket 40 detached from each other for illustrative convenience. The apparatus which is assembled as a unit, is best seen by reference to FIGS. 2, 3, and 4. It should be understood that the apparatus will be usually employed with a heating device such as a range or the like. However, it should be appreciated that the apparatus lends itself well to being utilized with other cooking devices such as microwave ovens.

In the preferred embodiment, which is best understood by reference to FIG. 2, a food product (not shown) which is to be processed, is placed internally of the inner jacket 40; and the inner jacket 40 is disposed in close mating relationship internally of the outer jacket 11 such that the pair of heat resistant handles 60 and the pair of stabilizing bars 70 are in individual receiving engagement internally of the four deep vertical slots 31 that are formed in the vertical wall 20 of the outer jacket. When positioned in such a fashion, the inner jacket is disposed in substantially covering relation internally of the outer jacket 11 and the porous bottom 41 rests in contact with the inside surface 13 of the bottom 12. In this position, heat energy imparted to the outside surface 14 is capable of being transmitted to the inner jacket 40. It should be understood that as the food product is being cooked, it will emit or otherwise produce various liquid by-products, fats, and juices. In the cooking position, which is shown in FIG. 3, these assorted liquids would remain in contact with the food being cooked.

As best seen by reference to FIG. 4, the inner jacket 40 is shown in a second, draining, attitude wherein the heat resistant handles 60 and the stabilizing bars 70 are deployed in internal receiving engagement with the shallow slots 30, which are formed in the outer jacket 11. A comparison of FIGS. 3 and 4, reveals that when the heat resistant handles and the stabilizing bars are placed into receiving engagement with the deep slots 31, the porous bottom 41 is caused to be disposed in an apposed attitude with respect to the inside surface 13 of the outer jacket; and when the heat resistant handles and stabilizing bars are placed into receiving engagement with the shallow slots 30, the inner jacket is caused to be disposed in a predetermined spaced relationship from the bottom 12 of the outer jacket.

When the inner jacket 40 is disposed in the second draining attitude, as illustrated in FIG. 4, any liquid by-product which has been produced during the cooking process is permitted to drain therethrough the small drainage holes 45 and is thereafter collected internally of the outer jacket 11, out of engagement with the food product. Although the inner jacket is disposed out of engagement with the liquid by-product, it should be understood that the inner jacket is disposed in such close proximity to the liquid by-product that it gains some benefit from the heat energy which is emitted from the same as it cools.

Moreover, it should be appreciated that the deployment of the heat resistant handles 60 and the stabilizing bars 70 in the fashion as illustrated in FIGS. 1 through 4 causes the inner jacket 40 to be suspended and restrained against horizontal and vertical movement in the selected operational attitudes internally of the outer jacket 11; the operational attitudes being defined by the multiplicity of deep slots 31 and shallow slots 30.

Therefore, the apparatus 10 can be utilized in a multitude of different cooking environments, and is adapted to permit an individual to quickly and easily separate a liquid by-product from a food that is being processed.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. A cooking vessel which permits the transmission of heat energy to a food product being processed, comprising:
   an outer heat conductive jacket of predetermined dimension, said outer jacket having a substantially vertical side wall, a top edge and a bottom surface, said side wall having formed therein a multiplicity of vertically disposed slots of varying length that extend downwardly from the top edge; and
   an inner heat conductive jacket conformably dimensioned for substantially close telescoping receipt internally of the outer heat conductive jacket, the inner jacket having a substantially vertical nonporous side wall of substantially uniform height, a top edge, and a bottom surface, the top edge mounting a pair of handles and a pair of stabilizing bars, said handles and stabilizing bars adapted to mate with the multiplicity of vertical slots formed in the side wall of the outer jacket, the bottom surface of said inner jacket having formed therein a multiplicity of small drainage holes that permits a liquid to pass therethrough.

2. The cooking vessel of claim 1 wherein the multiplicity of vertically disposed slots of varying length have four shallow slots and four deep slots, said shallow and deep slots disposed in substantially equidistant and alternate attitudes about the top edge, the shallow and deep slots adapted to engage the pair of handles and the pair of stabilizing bars to suspend the inner heat conductive jacket in selected operative attitudes internally of the outer head conductive jacket.

3. The cooking vessel of claim 2 wherein the movement of the pair of handles and the pair of stabilizing bars into engagement with the deep slots causes the bottom surface of the inner heat conductive jacket to be disposed in an apposed attitude with respect to the bottom surface of the outer jacket, and the movement of the pair of handles and the pair of stabilizing bars into engagemet with the shallow slots causes the bottom surface of the inner heat conductive jacket to be disposed in a predetermined spaced relation relative to the bottom surface of the outer heat conductive jacket.

4. A cooking vessel which permits the transmission of heat energy to a food product being processed, comprising:
   an outer heat conductive jacket defining a vacuous vessel of predetermined dimension, said vacuous vessel having a unitary substantially vertical side wall of uniform height, and a bottom surface integral with, and substantially normal to the side wall, said side wall having a top edge defining four shallow substantially vertical slots, and four deep substantially vertical slots, said shallow and deep slots alternatively positioned in substantially equidistant attitudes about the top edge of the side wall;
   an inner heat conductive jacket for receiving the food product to be processed, said inner heat conductive jacket having a non-porous side wall and a bottom surface the inner heat conductive jacket conformably dimensioned to be telescopically received in substantially covering relation internally of the outer heat conductive jacket, the bottom surface having formed therein a multiplicity of small drainage holes permitting communication between the outer heat conductive jacket, and the inner heat conductive jacket; and
   a pair of heat resistant handles and a pair of stabilizing bars substantially normal to and integral with the side walls of the inner heat conductive jacket, said individual handles and stabilizing bars each disposed in opposed equidistant attitudes about the top edge of the inner heat conductive jacket, said stabilizing bars and handles when moved into individual receiving engagement internally of the four deep vertical slots thereby causing the bottom surface of the inner heat conductive jacket to be placed in contact with the bottom surface of the outer heat conductive jacket, and when the stabilizing bars and handles are moved into individual receiving engagement internally of the four shallow slots, the bottom surface of the inner heat conductive jacket and the bottom surface of the outer heat conductive jacket are fixed in predetermined spaced relation.

5. The cooking vessel of claim 4 wherein the multiplicity of small holes are of a dimension which permits only a liquid to pass therethrough.

* * * * *